United States Patent [19]

Mikina et al.

[11] 4,212,480
[45] Jul. 15, 1980

[54] CONVERTIBLE EXERCISE BICYCLE

[76] Inventors: Stanley J. Mikina, 4782 Coquina Key Dr., St. Petersburg, Fla. 33705; John A. Mikina, 16975 Fitzgerald St., Livonia, Mich. 48154

[21] Appl. No.: 964,574

[22] Filed: Nov. 3, 1978

[51] Int. Cl.² ........................... B62M 1/20; B62H 1/04
[52] U.S. Cl. .................... 280/226 R; 272/73; 280/1.191; 280/220; 280/299
[58] Field of Search ............... 280/220, 221, 226 R, 280/226 A, 293, 295, 296, 1.191, 1.192, 298, 299, 301, 302; 272/73

[56] References Cited

U.S. PATENT DOCUMENTS

| 642,758 | 2/1900 | Runge | 280/226 R |
|---|---|---|---|
| 2,860,890 | 11/1958 | Oxford et al. | 280/226 R |
| 3,025,080 | 3/1962 | Nelson | 280/226 R |
| 3,133,747 | 5/1964 | Nelson | 280/226 R |
| 3,514,117 | 5/1970 | Olsen | 280/1.192 |
| 3,572,758 | 3/1971 | Lee | 280/296 |

FOREIGN PATENT DOCUMENTS 14943 of 1894 United Kingdom ............... 280/226 R

Primary Examiner—John P. Silverstrim
Assistant Examiner—Donn McGiehan
Attorney, Agent, or Firm—William J. Ruano

[57] ABSTRACT

A convertible exercising bicycle enabling oscillating the bicycle seat and rider, substantially up and down so as to exercise the rider's body by subjecting it to accelerations such as when riding a horse or in jogging or running. Means are provided to convert the bicycle to a fixed exercising machine suitable for indoor use. Also additional means are provided to allow for less strenuous exercise for elderly riders and the like.

4 Claims, 5 Drawing Figures

CONVERTIBLE EXERCISE BICYCLE

This invention relates to a convertible exercise bicycle.

A principal object of our invention is to provide a bicycle with eccentric circular or elliptical or other shaped cams, which are mounted on and rotated by either the rear wheel hub or the sprocket crank assembly, for the purpose of oscillating the bicycle seat and rider substantially up and down so as to exercise the rider's body more effectively by subjecting it to accelerations similar to those experienced in riding a horse or in jogging or running.

A further object of our invention is to provide these oscillatory exercises when the bicycle is either in forward motion or has no forward velocity, by a simple conversion means that in a matter of seconds transforms the travelling bicycle into a fixed exercise machine suitable for interior use, and vice versa.

A further object of our invention is to provide the fixed exercise machine with still another option, namely as a relatively less strenuous exerciser of knee and hip joints, without the oscillatory jogging displacements, for arthritic or elderly riders.

And finally, still another object of our invention is to convert the exerciser into a conventionally operating bicycle for forward travel without the jogging oscillations.

Figures 1, 2:
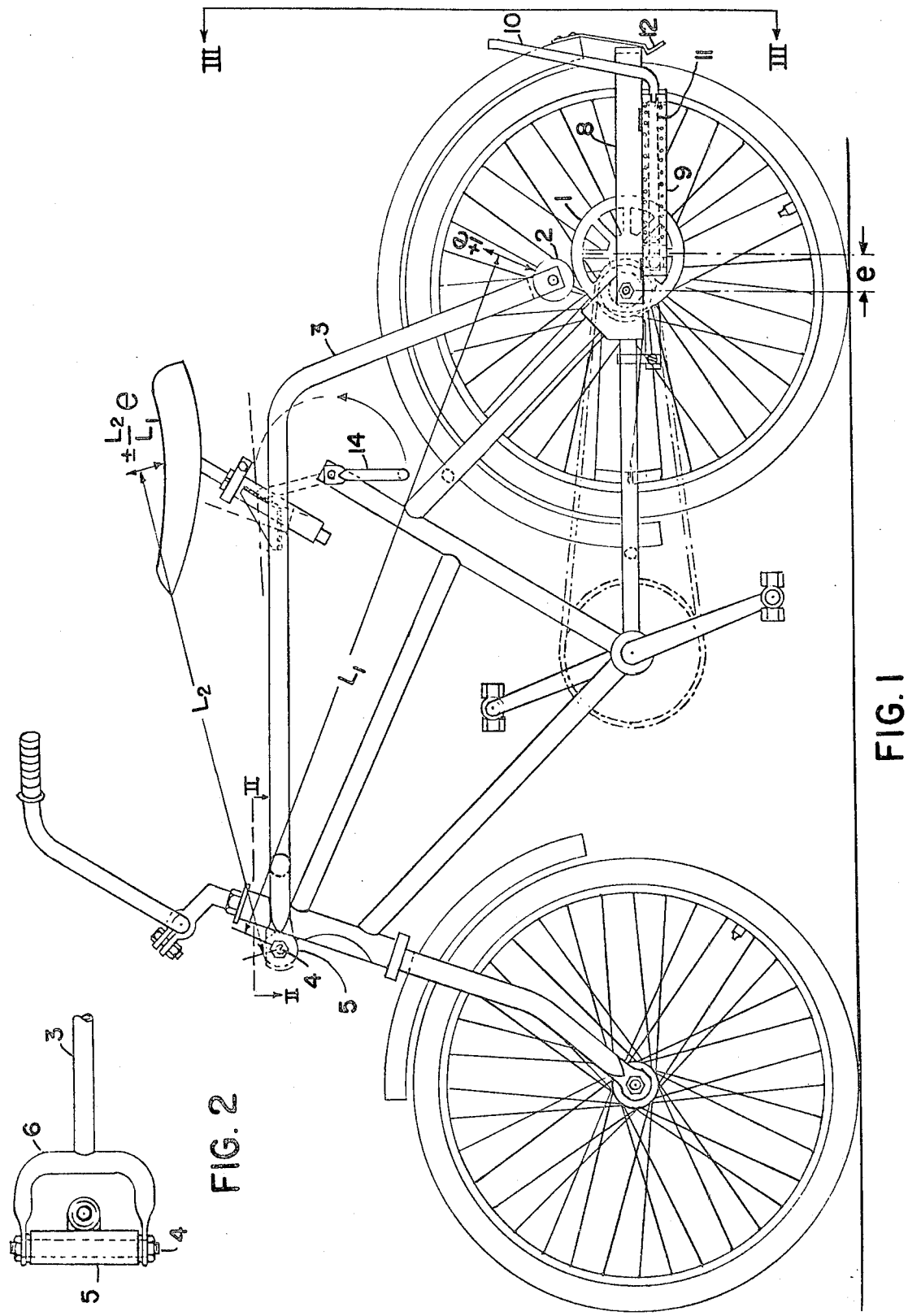
FIG. 1 is an elevational view of a convertible bicycle embodying our invention.
FIG. 2 is an enlarged cross-sectional view taken along line II—II of FIG. 1.

In the preferred embodiment of FIG. 1, a circular cam 1 is attached to the rear wheel hub with an eccentricity e between the cam center and the hub center. A cam follower roll 2, held in contact with the cam by the rider's weight, is given an oscillatory simple harmonic displacement of amplitude e by the rotation of the bicycle wheel and attached cam. Roll 2 is mounted on the end of tubular member 3 that is pivoted at the front of the bicycle on a pivot shaft 4 and bearing tube 5 mounted on the bicycle frame. Member 3 terminates in a forked assembly 6 that is wide enough to provide a stable and accurate support for member 3 and roll 2 in a direction normal to the plane of the figure, so as to keep roll 2 in line with the plane of cam 1 at all times.

The bicycle seat is mounted on member 3 at a distance $L_2$ from pivot 4 and therefore is also given an oscillatory simple harmonic displacement of an amplitude equal to $(L_2/L_1) e$, if $L_1$ if the distance from roll center 2 to pivot 4. The seat displacement is substantially vertical, being perpendicular at the top of the seat to the line $L_2$. The magnitude of e is chosen so as to make the seat amplitude $(L_2/L_1) e$ equal to approximately one inch (2 in. total travel). As will be shown later in the dynamic performance analysis, this amplitude is sufficient to provide a vertical seat acceleration equal to the acceleration of gravity at a speed of 15 pmh. With a fixed cam eccentricity e, the magnitude of the vertical acceleration is still under the control of the rider, being proportional to the square of the bicycle or wheel speed.

The second important object of this invention is to make these invigorating and healthful jogging exercises also available indoors at the option of the rider by operating the bicycle as a fixed exercise machine, through a simple conversion. This is made possible by equipping the bicycle with a novel kick-stand that lifts the rear bicycle wheel off the ground and provides a stable and safe support against machine overturning during the most vigorous jogging exercises.

The kick-stand assembly consists of a U-shaped member 8 pivoted on the rear axle and joined on each leg of the U to members 9 that retain and support the stabilizing bars 10 and their biasing springs 11. During over the road operation, the stand assembly is held in place by a spring member 12 mounted on the rear fender.

The novel feature of the stand is that when in place off the ground, it occupies a relatively narrow width and presents a small obstruction profile, but when lowered to the ground, it unfolds the support bars 10 to a position two feet or more in width for a firm and stable support during exercising or when getting on or off the machine. This is accomplished by providing two sets of positioning or indexing slots for bars 10 in members 9 into which a pin or keys on bars 10 fit. These slots may be made, for example, with a tubular member 9 by saw cuts on one end and then bending the sawn portions inward. These bent parts then position the lower end of bars 10 centrally in tube 9 and also form a base for the helical compression spring 11 that holds the bar 10 assembly tight in its engaged positioning slots.

Figure 3:
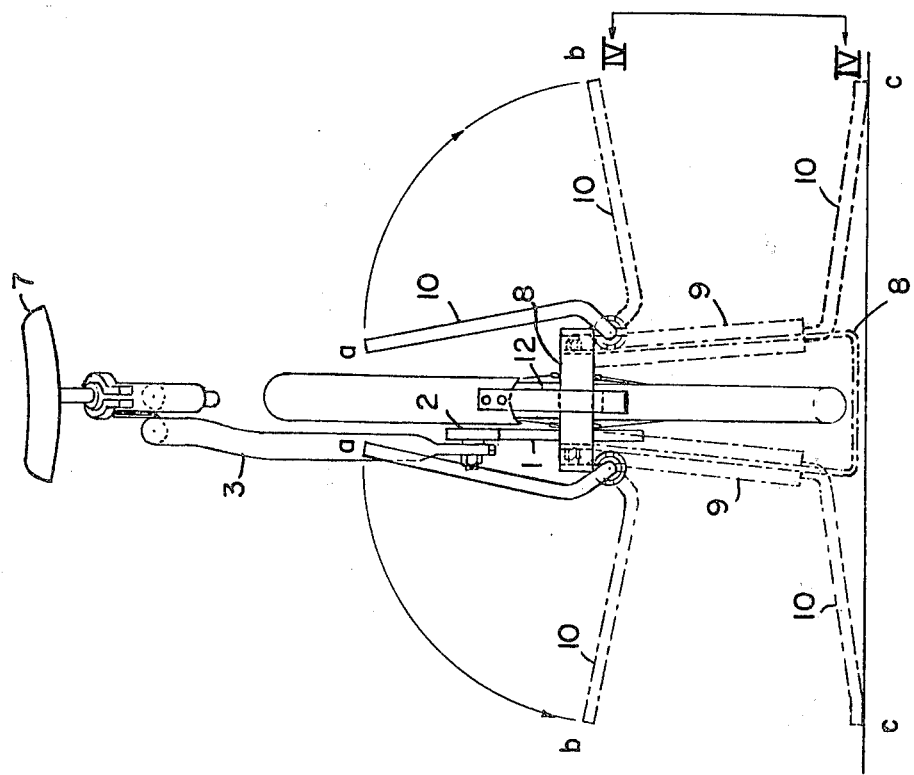
FIG. 3 is a rear view taken along line III—III of FIG. 1.

To lower the stand, bars 10 are first pulled out axially against the force of springs 11 and rotated about 90° from the initial stowed position a to position b in FIG. 3, where they are locked by springs 11 in the other set of indexing slots. Then U piece 8 is disengaged from spring clip 12 and rotated downward from position b to final position c, in which location it effectively lifts the rear bicycle wheel out of contact with the ground for this mode of operation.

Figure 4:
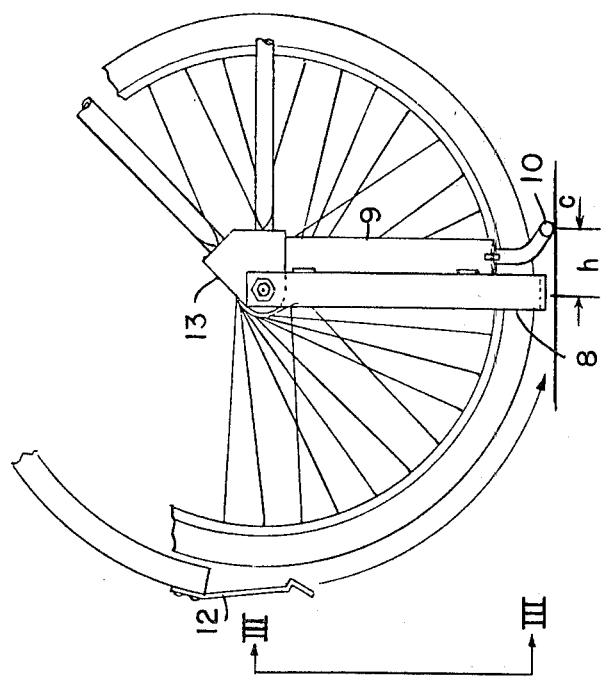
FIG. 4 is a side-view taken along line IV—IV of FIG. 3.

In position c, the stand is stopped against further angular displacement by contact between the upper end of member 9 and gusset plate 13 on the rear forks assembly, as shown in FIG. 4. The reaction force of the ground against the ends of bars 10 is at a distance h (FIG. 4) from the rear wheel axle and provides a moment and force for holding 9 firmly against its stop 13 and for aiding springs 11 in holding the positioning pins or keys in their slots.

A third important objective of our invention is to impart even greater versatility to the fixed base exerciser by making it possible to spin the rear wheel with little pedalling effort to provide a less strenuous mode of exercise of knee and hip joints for elderly or arthritic users. This is done by simply lifting roll 2 off cam 1 by means of a short U-shaped link member 14 that is rotated upward into position to prop up the member 3 on which roll 2 is mounted. The rider's weight is then transmitted directly into the bicycle frame through strut 14, which is held firmly in place against the slanted seat support by the rider's own weight. The limp flexing motions during pedalling in this mode provide the milder exercise required for knee or hip joints having impaired mobility.

And finally, the fourth important objective of our invention is to provide still another mode of operation, namely as a conventional bicycle for transportation without jogging if so desired. With link 14 in place in its upward position, this is accomplished simply by lowering the rear wheel back to the ground by raising the stand assembly into engagement with spring clip 12 and folding bars 10 into the vertical low profile position of FIG. 1.

Figure 5:
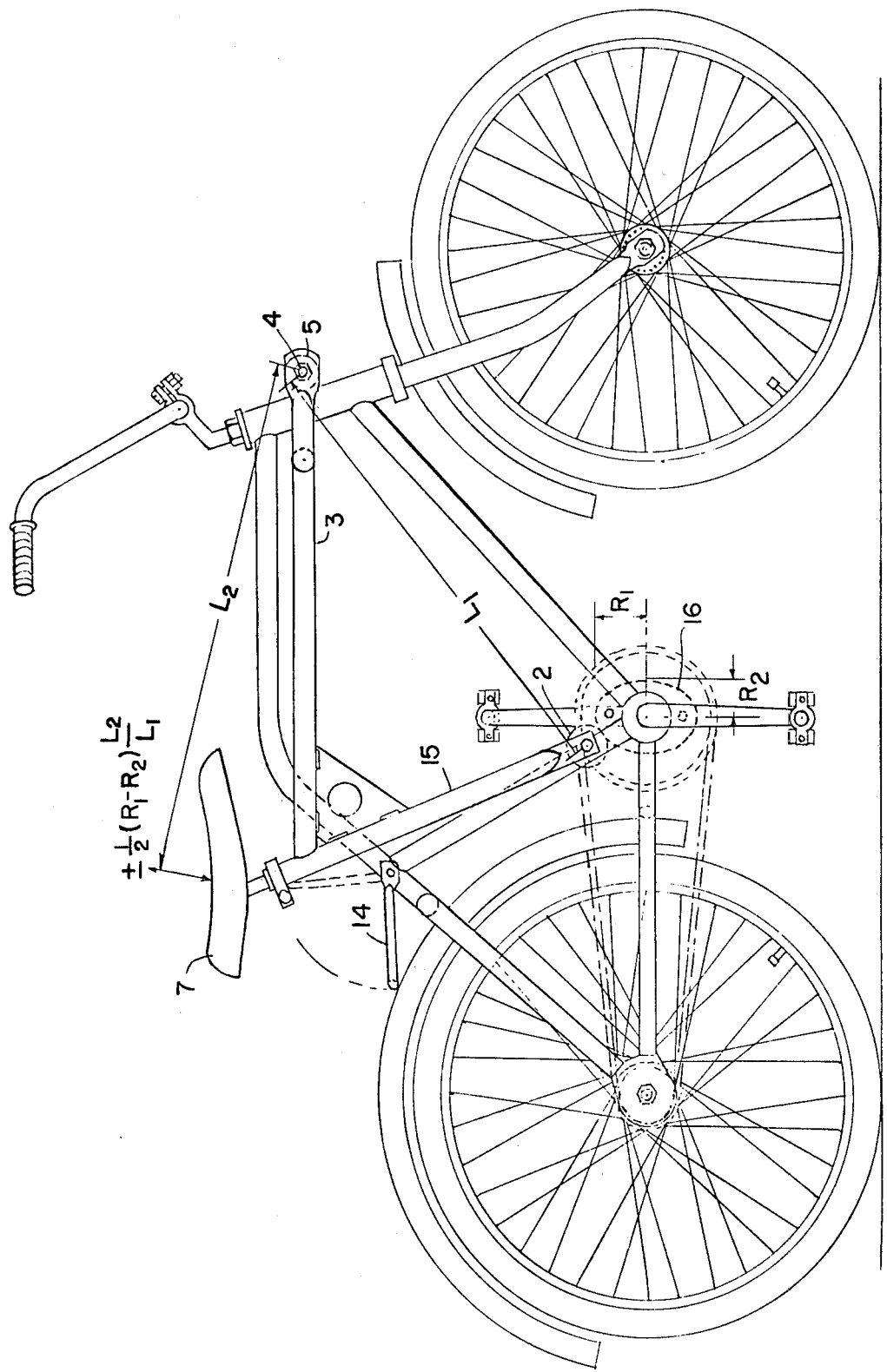
FIG. 5 is an elevational view of a modification.

In another embodiment of our invention, it is proposed to oscillate the rider's seat support by means of a cam mounted directly on the crank sprocket plate or crank shaft, instead of on the rear wheel hub. This is shown in FIG. 5. In this design, pivoted member 3 is joined to member 15 on the end of which cam roll 2 is mounted. Roll 2 is caused by the rider's weight to bear against cam 16, which is an elliptical or two-lobed cam whose center is on the crank shaft center. Since in all bicycles the pedal crank rotates at an angular speed equal to half the rear wheel speed or less, the two-lobed elliptical shape of the cam causes the rider's seat to oscillate at approximately the same frequency as in the embodiment of FIG. 1.

If $R_1$ and $R_2$ are the major and minor semi-axes of the cam, and if roll 2 is at a distance $L_1$ from pivot 4 while the seat center is at a distance $L_2$ from pivot 4, then the oscillation amplitude of roll 2 is $\frac{1}{2}(R_1-R_2)$ and the oscillation amplitude of the seat is $\frac{1}{2}(R_1-R_2) L_2/L_1$.

A U shaped link 14 is similarly provided here for lifting the seat and disengaging roll 2 from cam 16 for operation as a conventional bicycle. Similarly, a kickstand like that of FIG. 1 can be used for converting the bicycle to a fixed base exercise machine.

The dynamic jogging performance of the two embodiments may be readily calculated since the oscillation is simple harmonic. For example, in the case of FIG. 1, with a forward bicycle velocity V and a wheel radius r, the angular wheel velocity is $$w = v/r \text{ radians/sec} \tag{1}$$

The oscillation frequency is then $$f = w/2\pi = V/2\pi r \text{ cycles/sec} \tag{2}$$

For a 26 inch diameter wheel and a forward velocity of 15 mph = 22 ft/sec, $$f = \frac{22 \times 12}{2\pi \times 13} = 3.23 \text{ cycles/sec} \tag{3}$$

The oscillation frequency will be proportionally lower at lower forward speeds and higher at higher forward speeds. Thus $f=2.15$ cycles/sec at 10 mph and 1.08 cycles/sec at 5 mph with this size wheel.

A quantity of particular significance in this application is the magnitude of the vertical seat acceleration due to the cam eccentricity e. In FIG. 1, the acceleration of roll 2 due to its simple harmonic oscillation is $$A = w^2 e = \frac{V^2}{r^2} e \tag{4}$$

This acceleration is along the line joining the center of roll 2 to the center of the wheel hub on which the cam is mounted. The resulting substantially vertical acceleration of the bicycle seat and rider is thus approximately equal to $$A_s = A \frac{L_2}{L_1} = \frac{L_2}{L_1} \frac{V^2}{r^2} e \tag{5}$$

If in a typical design $L_1=45$ inches and $L_2=30$ inches, then the seat acceleration is $$A_s = \frac{2}{3} \frac{V^2}{r^2} e$$

Again, at 15 mph=22 ft/sec and a 26 inch diameter wheel:

$$A_s = \frac{2}{3} \frac{(22 \times 12)^2}{13^2} e = 274.7 \, e \text{ in./sec}^2 \tag{6}$$

Since the acceleration of gravity is $g=387$ in./sec.$^2$, it is evident that the value of the cam eccentricity e that will make $A_s$ just equal to g at 15 mph is $$e = \frac{387}{274.7} = 1.409 \text{ in.} \tag{7}$$

The corresponding seat amplitude is $1.409 \times 2/3 = 0.939$ in. (or 1.878" double amplitude for the total seat motion). This value of eccentricity is easily physically possible without excessive cam size.

The bodily sensation produced in the above condition would be akin to that experienced during an exhilarating gallop on a horse. The rider would be nearly lifted off his seat during the peak of one half cycle, and would feel a seat force varying from zero to twice its static value. From formula (5) it is evident that the seat acceleration is proportional to the square of the wheel speed. Thus, the severity of the jogging exercise is at the control of the rider simply by control of the wheel speed.

It is worth noting that the pedal effort with this bicycle in the jogging mode will be no greater than with the conventional bicycle, since the energy expended to cause the rider's seat to rise will be recovered after the rider reaches the peak and starts to descend to the lowest position during the oscillation. Forward velocity will also be maintained by the system momentum.

The previous calculation of the dynamic performance of the jogging bicycle in forward travel is directly applicable to the fixed base exercise mode of operation if V is understood to be the peripheral velocity of the rear bicycle wheel instead of the bicycle forward speed. The conclusions regarding the values of $A_s$ and e are thus unchanged.

In the embodiment of FIG. 5, the oscillation frequency and acceleration are substantially the same as in the embodiment of FIG. 1, since the lower angular velocity of the cam is compensated for by having an elliptical or two-lobed shape with two peaks and valleys. The effective eccentricity of the cam is $$e = 178 \, (R_1 - R_2) \tag{8}$$

In a typical design $L_1=26$ in. and $L_2=30$ in. Using formula (5) because the oscillation frequency here is the same as that of formula (3), $$A_s = \frac{(22 \times 12)^2}{13^2} \times \frac{30}{26} \times \tag{9}$$

-continued
$$\tfrac{1}{2}(R_1 - R_2) = 238(R_1 - R_2) \text{ in/sec}^2$$

The value of $R_1-R_2$ that will make $A_s$ just equal to g at 15 mph is $$R_1 - R_2 = \frac{387}{238} = 1.626 \text{ in.} \qquad (10)$$

If $R_1=3$ in., then $R_2=3-1.626=1.374$ in. Such dimensions are readily realizable in the available space at the crank sprocket.

Thus it will be seen that we have provided a highly versatile and efficient, convertible exercising bicycle that can exercise the rider's body vigorously, similar to riding a horse, jogging or running; also, it embodies conversion means to enable such exercise to be done indoors, with the bicycle stationary, or outdoors—and, in addition, providing for less strenuous exercise for the elderly.

While we have illustrated and described several embodiments of our invention, it will be understood that these are by way of illustration only and that various changes and modifications may be contemplated in our invention and within the scope of the following claims:

We claim:

1. In a convertible exercise bicycle comprising front and rear wheels, a seat, a pedal and driving mechanism for oscillating said seat substantially vertically, a stowable and expandable stand comprising a substantially U-shaped member surrounding said rear wheel, a spring clip for normally holding said stand horizontally in the raised position, and a pair of foldable bars attached to the sides of said U-shaped member and normally held upwardly closely adjacent said rear wheel, and means for spreading said bars outwardly and locking them when said stand is moved to the ground engaging position so as to lift the rear wheel from the ground to enable free rotation thereof, said bars thereby providing safe lateral support to said stand when the stationary bicycle is used as a jogging exercise machine.

2. A convertible exercise bicycle as recited in claim 1 wherein said driving mechanism includes a cam driven by said rear wheel, a member pivoted at one end on the front of the frame of said bicycle and supporting said seat intermediate the length of said member, a cam follower rotatably supported on a downwardly extending rear end of said member and frictionally engaging said cam and held there-against solely by gravity and the weight of the rider, and link means for locking said member in a pivotally raised position whereby said cam follower is raised from engagement with said cam.

3. A convertible exercise bicycle as recited in claim 1 together with a pair of tubular members attached alongside the legs of said substantially U-shaped member and having two sets of slots 90° apart on their lower ends and biasing springs for retaining and supporting said pair of foldable bars, keys attached to said bars for selectively locking said bars in either their folded or expanded position and held by said biasing springs in either of said two sets of slots, one set of slots determining a narrow frontal profile configuration of said bars when the stand is in the up or stowed position, and the other set of slots locking said bars in the down and expanded position for providing the maximum width for stable and safe support of the bicycle in the purely static mode of exerciser operation, said U-shaped member held in position against a stop on the frame by the moment of the reaction forces of the ground against the ends of said stabilizer bars.

4. A convertible exercise bicycle as recited in claim 3, wherein said pair of foldable bars are selectively movable to three locked positions, one folded toward said rear wheels during normal operation, one extended outwardly against the action of said biasing spring in a raised position from the ground and one raised outwardly contacting the ground when the stand is lowered underneath said rear wheel, which wheel is raised above the ground by said stand.

* * * * *